United States Patent
Dejneka et al.

(10) Patent No.: US 11,161,772 B2
(45) Date of Patent: Nov. 2, 2021

(54) THIN MULTILAYER LAMINATE

(71) Applicant: CORNING INCORPORATED, Corning, NY (US)

(72) Inventors: Matthew John Dejneka, Corning, NY (US); Jonathan Earl Walter, Woodhull, NY (US)

(73) Assignee: Corning Incorporated, Corning, NY (US)

( * ) Notice: Subject to any disclaimer, the term of this patent is extended or adjusted under 35 U.S.C. 154(b) by 70 days.

(21) Appl. No.: 16/692,118

(22) Filed: Nov. 22, 2019

(65) Prior Publication Data

US 2020/0172428 A1    Jun. 4, 2020

Related U.S. Application Data

(60) Provisional application No. 62/773,560, filed on Nov. 30, 2018.

(51) Int. Cl.
| | | |
|---|---|---|
| *B32B 15/04* | (2006.01) | |
| *C03C 3/091* | (2006.01) | |
| *B32B 17/10* | (2006.01) | |
| *C03B 17/06* | (2006.01) | |

(52) U.S. Cl.
CPC ........ *C03C 3/091* (2013.01); *B32B 17/10036* (2013.01); *B32B 17/10045* (2013.01); *B32B 17/10073* (2013.01); *B32B 17/10807* (2013.01); *C03B 17/06* (2013.01)

(58) Field of Classification Search
CPC .................... B32B 17/10045; B32B 17/10036
USPC ........................................................ 428/428
See application file for complete search history.

(56) References Cited

U.S. PATENT DOCUMENTS

| | | | | |
|---|---|---|---|---|
| 4,130,684 A | * | 12/1978 | Littell, Jr. | ......... B32B 17/10761 428/212 |
| 7,534,734 B2 | | 5/2009 | Ellison | |
| 7,851,394 B2 | | 12/2010 | Ellison | |
| 8,142,894 B2 | * | 3/2012 | Shimatani | ......... B32B 17/10761 428/426 |
| 8,658,283 B2 | * | 2/2014 | Shimatani | ............. A47F 3/0434 428/426 |
| 10,216,230 B2 | * | 2/2019 | Kim | ........................ H01L 27/32 |
| 10,279,567 B2 | * | 5/2019 | Jain | ................... B32B 17/10779 |
| 10,596,783 B2 | * | 3/2020 | Fisher | ............... B32B 17/10036 |
| 10,859,869 B2 | * | 12/2020 | Suzuki | .............. G02F 1/133305 |

(Continued)

FOREIGN PATENT DOCUMENTS

WO        2018183105 A1    10/2018

OTHER PUBLICATIONS

International Search Report and Written Opinion of the European International Searching Authority; PCT/US2019/062520; dated Feb. 27, 2020; 15 Pgs.

*Primary Examiner* — Lauren R Colgan

(74) *Attorney, Agent, or Firm* — Kevin M. Johnson

(57) ABSTRACT

Laminated glass-based articles are provided. The glass-based articles include at least a first glass-based layer, a second glass-based layer, and a polymer layer disposed between the first and second glass-based layers. At least one of the first and second glass-based layers has a thickness of less than or equal to 200 μm, and the polymer layer has a thickness of less than or equal to 100 μm. The polymer layer has an elastic modulus greater than or equal to 100 MPa at a strain rate of 1/s. Methods of producing the laminated glass-based articles are also provided.

27 Claims, 4 Drawing Sheets

(56) References Cited

U.S. PATENT DOCUMENTS

| | | | |
|---|---|---|---|
| 2003/0077453 A1* | 4/2003 | Oaku | B32B 17/10036 428/415 |
| 2003/0139520 A1* | 7/2003 | Toyama | B32B 17/10972 524/503 |
| 2009/0311497 A1* | 12/2009 | Aoki | B32B 17/10055 428/214 |
| 2010/0028585 A1* | 2/2010 | Shimatani | B32B 17/10045 428/38 |
| 2015/0210588 A1* | 7/2015 | Chang | B32B 37/12 361/750 |
| 2015/0258750 A1* | 9/2015 | Kang | B29C 65/54 428/174 |
| 2016/0082705 A1* | 3/2016 | Fisher | C03C 27/10 428/215 |
| 2016/0207290 A1* | 7/2016 | Cleary | B32B 17/10761 |
| 2016/0207819 A1* | 7/2016 | Cleary | B32B 17/10743 |
| 2016/0207820 A1* | 7/2016 | Cleary | B32B 17/10137 |
| 2016/0238752 A1 | 8/2016 | Wiersema | |
| 2017/0028687 A1* | 2/2017 | DeRosa | C08L 33/10 |
| 2017/0197384 A1* | 7/2017 | Finkeldey | C03C 3/091 |

* cited by examiner

THIN MULTILAYER LAMINATE

CROSS-REFERENCE TO RELATED APPLICATIONS

This application claims the benefit of priority of U.S. Provisional Application Ser. No. 62/773,560 filed on Nov. 30, 2018, the content of which is relied upon and incorporated herein by reference in its entirety.

BACKGROUND

Field

The present specification generally relates to laminated glass-based articles and, more specifically, to laminated glass-based articles comprising glass layers separated by an adhesive layer and methods of forming the same.

Technical Background

Glass articles, such as cover glasses, glass backplates and the like, are employed in both consumer and commercial electronic devices such as LCD and LED displays, computer monitors, automated teller machines (ATMs), and the like. Some of these glass articles may include "touch" functionality which necessitates that the glass article be contacted by various objects including a user's fingers and/or stylus devices and, as such, the glass must be sufficiently robust to endure regular contact without damage, such as scratching. Indeed, scratches introduced into the surface of the glass article may reduce the strength of the glass article as the scratches may serve as initiation points for cracks leading to catastrophic failure of the glass.

Moreover, such glass articles may also be incorporated in portable electronic devices, such as mobile telephones, personal media players, laptop computers and tablet computers. The glass articles incorporated in these devices may be susceptible to sharp impact damage during transport and/or use of the associated device. Sharp impact damage may include, for example, damage caused by dropping the device. Such mechanical damage may lead to failure of the glass.

Accordingly, a need exists for alternative glass articles that are resistant to failure due to mechanical damage incident on the surfaces and edges of the glass article.

SUMMARY

According to aspect (1), an article is provided. The article comprises: a first glass-based layer; a second glass-based layer; and a first polymer layer disposed between the first glass-based layer and the second glass-based layer. At least one of the first glass-based layer and the second glass-based layer have a thickness of less than or equal to 200 μm, and the first polymer layer has a thickness of less than or equal to 100 μm. The first polymer layer has an elastic modulus greater than or equal to 100 MPa at a strain rate of 1/s.

According to aspect (2), the article of aspect (1) is provided, wherein both the first glass-based layer and the second glass-based layer have a thickness of less than or equal to 200 μm.

According to aspect (3), the article of aspect (1) or (2) is provided, further comprising: a third glass-based layer; and a second polymer layer disposed between the second glass-based layer and the third glass-based layer. The third glass-based layer has a thickness of less than or equal to 200 μm, the second polymer layer has a thickness of less than or equal to 100 μm, and the second polymer layer has an elastic modulus greater than or equal to 100 MPa at a strain rate of 1/s.

According to aspect (4), the article of aspect (3) is provided, further comprising: a fourth glass-based layer; a fifth glass-based layer; a sixth glass-based layer; a third polymer layer disposed between the third glass-based layer and the fourth glass-based layer; a fourth polymer layer disposed between the fourth glass-based layer and the fifth glass-based layer; and a fifth polymer layer disposed between the fifth glass-based layer and the sixth glass-based layer. The fourth glass-based layer, fifth glass-based layer, and sixth glass-based layer have a thickness of less than or equal to 200 μm, and the third polymer layer, fourth polymer layer, and fifth polymer layer have a thickness of less than or equal to 100 μm. The third polymer layer, fourth polymer layer, and fifth polymer layer have an elastic modulus greater than or equal to 100 MPa at a strain rate of 1/s.

According to aspect (5), the article of any of aspects (1) to (4) is provided, wherein the first glass-based layer has a Knoop scratch threshold greater than or equal to 5 N.

According to aspect (6), the article of any of aspects (1) to (5) is provided, wherein the first glass-based layer has a Vickers scratch threshold greater than or equal to 0.5 N.

According to aspect (7), the article of any of aspects (1) to (6) is provided, wherein the first glass-based layer and the second glass-based layer have a thickness of less than or equal to 100 μm.

According to aspect (8), the article of any of aspects (1) to (7) is provided, wherein the first polymer layer has a thickness of less than or equal to 50 μm.

According to aspect (9), the article of any of aspects (1) to (8) is provided, wherein the first glass-based layer is an aluminoborosilicate.

According to aspect (10), the article of any of aspects (1) to (9) is provided, wherein the first glass-based layer comprises: 50 mol % to 85 mol % $SiO_2$; 5 mol % to 30 mol % $B_2O_3$; and 5 mol % to 30 mol % $Al_2O_3$.

According to aspect (11), the article of any of aspects (1) to (10) is provided, wherein the first glass-based layer is characterized by: R'O—$R_2O$—$Al_2O_3$≤4 mol %, wherein R'O=BeO, MgO, SrO, BaO, and ZnO, and $R_2O$=$Li_2O$, $Na_2O$, $K_2O$, $Rb_2O$, and $Cs_2O$.

According to aspect (12), the article of any of aspects (1) to (11) is provided, wherein the first glass-based layer is characterized by: $B_2O_3$≥R'O—$R_2O$—$Al_2O_3$+4 mol %, wherein R'O=BeO, MgO, SrO, BaO, and ZnO, and $R_2O$=$Li_2O$, $Na_2O$, $K_2O$, $Rb_2O$, and $Cs_2O$.

According to aspect (13), the article of any of aspects (1) to (12) is provided, wherein the first glass-based layer is substantially free of $R_2O$, wherein $R_2O$=$Li_2O$, $Na_2O$, $K_2O$, $Rb_2O$, and $Cs_2O$.

According to aspect (14), the article of any of aspects (1) to (13) is provided, wherein the first polymer layer has a ratio of the elastic modulus divided by the thickness of greater than or equal to 1 MPa/μm.

According to aspect (15), the article of any of aspects (1) to (14) is provided, wherein the first polymer layer has a ratio of the elastic modulus divided by the thickness of greater than or equal to 10 MPa/μm.

According to aspect (16), the article of any of aspects (1) to (15) is provided, wherein an elastic modulus of the article is greater than 30 GPa in a direction perpendicular to the major plane of the first glass-based layer.

According to aspect (17), the article of any of aspects (1) to (16) is provided, wherein the first glass-based layer and the second glass-based layer have a thickness that is greater than the thickness of the first polymer layer.

According to aspect (18), the article of any of aspects (1) to (17) is provided, wherein the first polymer layer comprises an ultraviolet curable resin.

According to aspect (19), the article of any of aspects (1) to (18) is provided, wherein the article has a transmission of greater than or equal to 90% in the wavelength range of 400 nm to 750 nm.

According to aspect (20), a consumer electronic product is provided. The consumer electronic product comprises: a housing having a front surface, a back surface and side surfaces; electrical components provided at least partially within the housing, the electrical components including at least a controller, a memory, and a display, the display being provided at or adjacent the front surface of the housing; and a cover glass disposed over the display. A least a portion of at least one of the housing and the cover glass comprises the article of any of aspects (1) to (19).

According to aspect (21), a method is provided. The method comprises: disposing a first polymer layer between a first glass-based layer and a second glass-based layer; and curing the first polymer layer such that the first polymer layer has an elastic modulus greater than or equal to 100 MPa at a strain rate of 1/s. At least one of the first glass-based layer and the second glass-based layer have a thickness of less than or equal to 200 µm, and the first polymer layer has a thickness of less than or equal to 100 µm.

According to aspect (22), the method of aspect (21) is provided, wherein both the first glass-based layer and the second glass-based layer have a thickness of less than or equal to 200 µm.

According to aspect (23), the method of aspect (21) or (22) is provided, further comprising: disposing a second polymer layer between the second glass-based layer and a third glass-based layer; and curing the second polymer layer such that the second polymer layer has an elastic modulus greater than or equal to 100 MPa at a strain rate of 1/s. The third glass-based layer has a thickness of less than or equal to 200 µm, and the second polymer layer has a thickness of less than or equal to 100 µm.

According to aspect (24), the method of aspect (23) is provided, further comprising: disposing a third polymer layer between the third glass-based layer and a fourth glass-based layer; disposing a fourth polymer layer between the fourth glass-based layer and a fifth glass-based layer; disposing a fifth polymer layer between the fifth glass-based layer and a sixth glass-based layer; and curing the third polymer layer, fourth polymer layer, and fifth polymer layer such that the third polymer layer, fourth polymer layer, and fifth polymer layer have an elastic modulus greater than or equal to 100 MPa at a strain rate of 1/s. The fourth glass-based layer, fifth glass-based layer, and sixth glass-based layer have a thickness of less than or equal to 200 µm, and the third polymer layer, fourth polymer layer, and fifth polymer layer have a thickness of less than or equal to 100 µm.

According to aspect (25), the method of aspect (23) or (24) is provided, wherein the curing of all of the polymer layers takes place concurrently.

According to aspect (26), the method of any of aspects (21) to (25) is provided, wherein curing the first polymer layer comprises exposing the first polymer layer to ultraviolet radiation.

According to aspect (27), the method of any of aspects (21) to (26) is provided, wherein curing the first polymer layer comprises heating the first polymer layer.

Additional features and advantages of the laminated glass articles and methods for forming the same described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
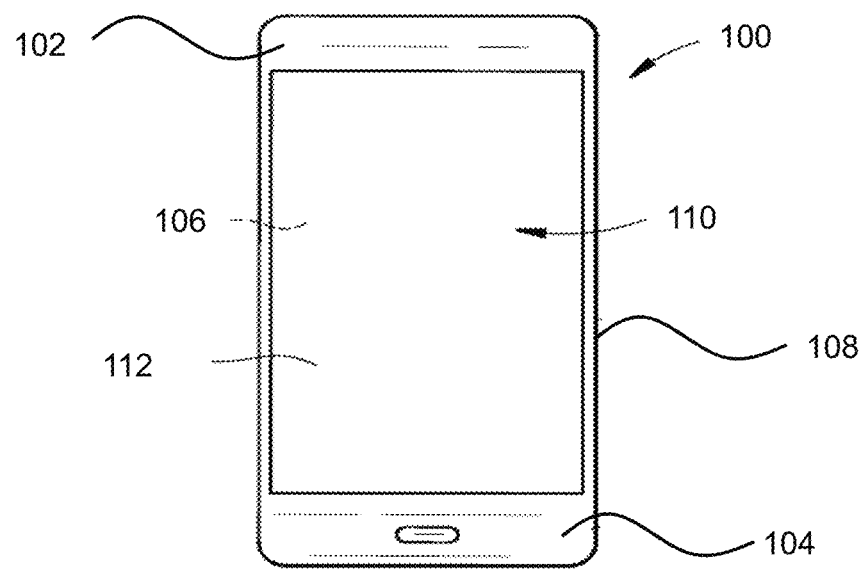
FIG. 1 schematically depicts a front view of a consumer electronic device comprising a glass-based article, according to one or more embodiments described herein.

Reference will now be made in detail to embodiments of glass-based articles comprising a plurality of glass-based layers and polymer layers disposed between the glass-based layers, examples of which are illustrated in the accompanying drawings.

Ranges can be expressed herein as from "about" one particular value, and/or to "about" another particular value. When such a range is expressed, another embodiment includes from the one particular value and/or to the other particular value (i.e., the range is inclusive of the expressly stated endpoints). Similarly, when values are expressed as approximations, by use of the antecedent "about," it will be understood that the particular value forms another embodiment. For example, the range "from about 1 to about 2" also expressly includes the range "from 1 to 2". Similarly, the range "about 1 to about 2" also expressly includes the range of "1 to 2". It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The glass-based articles described herein are laminates of at least two glass-based layers and a polymer layer disposed between the glass-based layers. At least one of the glass-based layers is thin, with a thickness of less than or equal to 200 µm. The polymer layer is thinner than the glass-based layers, and may have a thickness of less than or equal to 100 µm. The polymer layer is selected to be stiff, such that sharp flexure of the glass-based layers is prevented and the resistance of the laminated glass-based article to breakage is increased. The resistance to breakage of the glass-based article may exceed that of chemically strengthened monolithic glass-based articles with a similar thickness, as indicated by the result of drop tests.

The glass-based articles described herein provide a high resistance to fracture without requiring chemical strengthening or thermal tempering. For this reason, the manufacturing of the glass-based articles may be simplified and cost may be reduced. Additionally, the ability of to achieve high fracture resistance without requiring ion exchange strengthening allows the glass-based layers to be free or substantially free of alkali metals, which are undesirable in some electronic device applications. As utilized herein, the term "substantially free" indicates that a component is not actively added to a composition or article, but may be present in amounts less than or equal to 0.1 mol % as an impurity. The term "glass-based" is used herein to include any object made wholly or partly of glass, such as glasses and glass-ceramics (including an amorphous phase and a crystalline phase).

Figure 2:
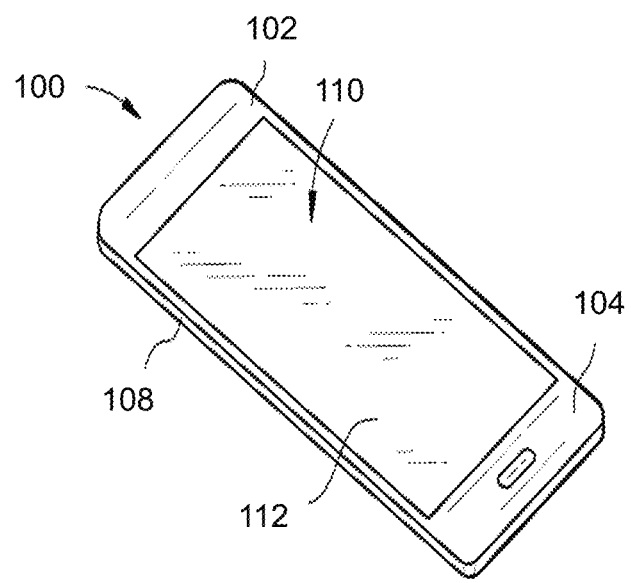
FIG. 2 schematically depicts a perspective view of the consumer electronic device of FIG. 1.

The laminated glass-based articles disclosed herein may be incorporated into other articles such as articles with displays (or display articles) (e.g., consumer electronics, including monitors, televisions, mobile phones, tablets, computers, navigation systems, wearable devices (e.g., watches) and the like), architectural articles, transportation articles (e.g., windows for vehicles including cars, trucks, trains, aircraft, sea craft, etc.), appliance articles, or any article that requires some transparency and improved resistance to damage. An exemplary article incorporating any of the laminated glass-based articles disclosed herein is schematically depicted in FIGS. 1 and 2. Specifically, FIGS. 1 and 2 show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In some embodiments, at least a portion of at least one of the cover substrate 112 and the housing 102 may include any of the laminated glass-based articles disclosed herein.

The glass-based articles described herein include at least a first glass-based layer, a second glass-based layer, and a first polymer layer disposed between the first glass-based layer and the second glass-based layer. The individual glass-based layers and polymer layers included in the glass-based article may be selected to have any of the characteristics described below.

Figure 3:
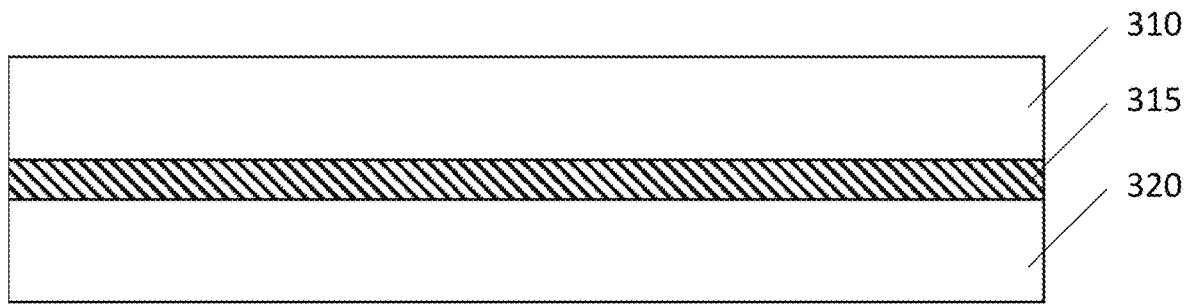
FIG. 3 schematically depicts a cross section of a glass-based article, according to one or more embodiments shown and described herein.
Figure 4:
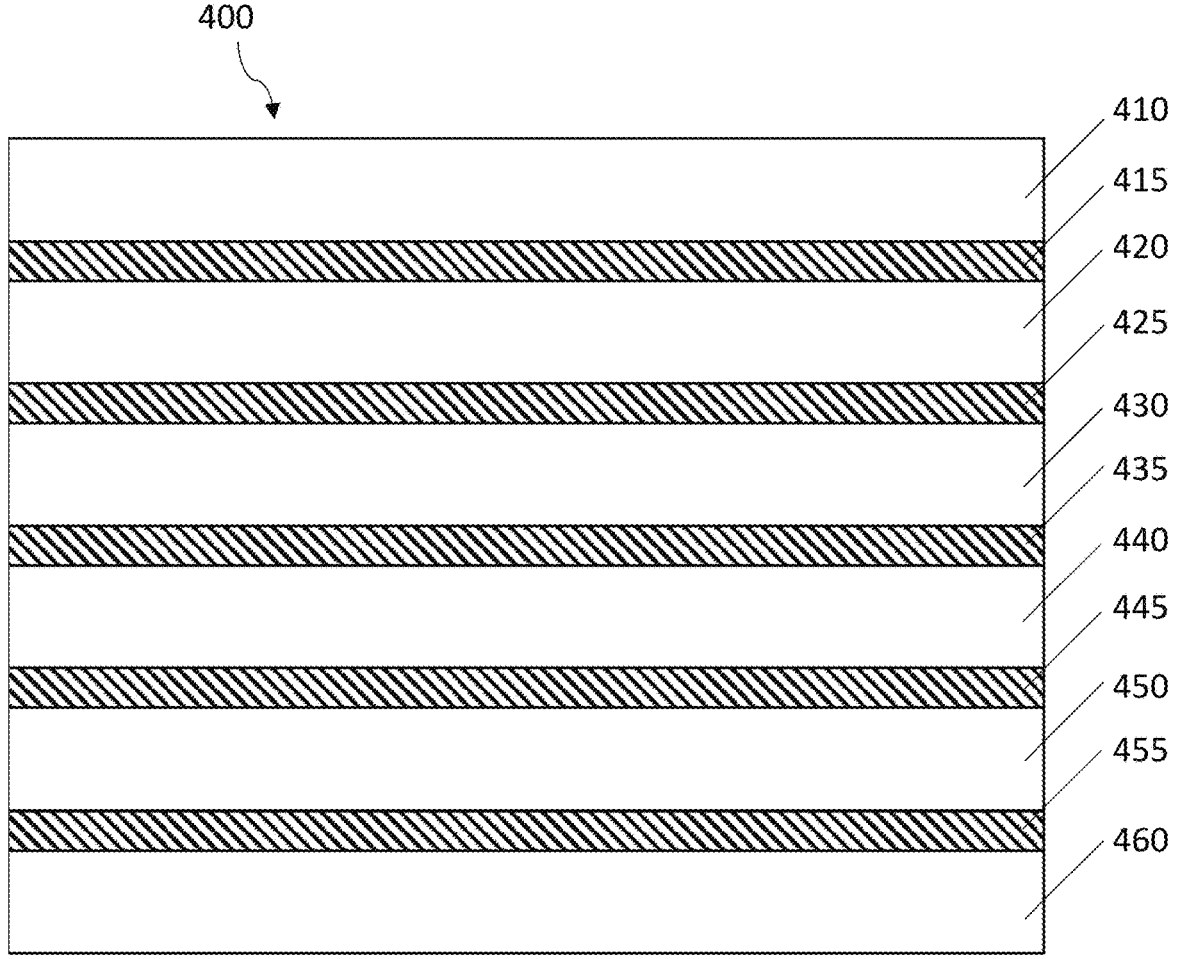
FIG. 4 schematically depicts a cross section of a glass-based article, according to one or more embodiments shown and described herein.

An exemplary glass-based article is illustrated in FIG. 3. The glass-based article 300 in FIG. 3 includes a first glass-based layer 310, a second glass-based layer 320, and a first polymer layer 315 disposed between the glass-based layers. In embodiments, the glass-based articles may include additional glass-based layers. As shown in FIG. 4, the glass-based article 400 includes a first glass-based layer 410, a first polymer layer 415, a second glass-based layer 420, a second polymer layer 425, a third glass-based layer 430, a third polymer layer 435, a fourth glass-based layer 440, a fourth polymer layer 445, a fifth glass-based layer 450, a fifth polymer layer 455, and a sixth glass-based layer 460. While the glass-based article shown in FIG. 4 includes six glass-based layers, the glass-based articles described herein may include any number of glass-based layers greater than or equal to two. For example, the glass-based article may include greater than or equal to three glass-based layers, such as greater than or equal to four glass-based layers, greater than or equal to five glass-based layers, greater than or equal to six glass-based layers, or more. In general, the glass-based article may include one less polymer layer than the number of glass-based layers. As shown in FIGS. 3 and 4, the outer planar surfaces of the glass-based articles may be formed by a glass-based layer. For this reason, at least some of the properties of the glass-based article, such as scratch resistance, may be attributable and substantially similar to the properties of the outer/exposed glass-based layer.

The glass-based articles disclosed herein include at least one glass-based layer with a thickness of less than or equal to 200 µm. The low thicknesses of the glass-based layers allows the layers to bend and dissipate impact energy, reducing or preventing fracture. Additionally, the thinness of the glass-based layers may reduce the visibility of any cracks that do form in the glass-based layers. In some embodiments, all of the glass-based layers in the glass-based articles may have thicknesses of less than or equal to 200 µm. As shown in FIGS. 3 and 4, the glass-based layers in the glass-based articles may have substantially equivalent or equivalent thicknesses. In some embodiments, the glass-based layers included in the glass-based articles may have different thicknesses. In embodiments, at least one of the glass-based layers in the glass-based article has a thickness of less than or equal to 200 µm, such as less than or equal to 190 µm, less than or equal to 180 µm, less than or equal to 170 µm, less than or equal to 160 µm, less than or equal to 150 µm, less than or equal to 140 µm, less than or equal to 130 µm, less than or equal to 120 µm, less than or equal to 110 µm, less than or equal to 100 µm, less than or equal to 90 µm, or less. In embodiments, at least one of the glass-based layers in the glass-based article has a thickness of from greater than or equal to 90 µm to less than or equal to 200 µm, such as from greater than or equal to 100 µm to less than or equal to 190 µm, from greater than or equal to 110 µm to less than or equal to 180 µm, from greater than or equal to 120 µm to less than or equal to 170 µm, from greater than or equal to 130 µm to less than or equal to 160 µm, from greater than or equal to 140 µm to less than or equal to 150 µm, and any and all sub-ranges formed from any of these endpoints.

The glass-based articles disclosed herein include at least one polymer layer disposed between the glass-based layers with a thickness of less than or equal to 100 µm. The low thickness of the polymer layer contributes to the ability of the glass-based article to resist breakage. Without wishing to be bound by any particular theory, the thin polymer layer, in combination with the stiffness of the polymer described below, may prevent the individual glass-based layers from sharp flexure when dropped or subjected to an impact, thereby preventing fracture of the glass-based layers. The polymer layer also protects the surfaces of the glass-based layers with which it is in contact from the introduction of new flaws that may lead to fracture, and in some embodiments may reduce or prevent the growth of flaws present in the surfaces with which it is in contact. In some embodiments, all of the polymer layers disposed between the glass-based layers in the glass-based articles may, individually, have a thickness of less than or equal to 100 µm. In embodiments, the polymer layers may individually have a thickness of less than or equal to 100 µm, such as less than or equal to 95 µm, less than or equal to 90 µm, less than or equal to 85 µm, less than or equal to 80 µm, less than or equal to 75 µm, less than or equal to 70 µm, less than or equal to 65 µm, less than or equal to 60 µm, less than or equal to 55 µm, less than or equal to 50 µm, less than or equal to 45 µm, less than or equal to 40 µm, less than or equal to 35 µm, less than or equal to 30 µm, less than or equal to 25 µm, less than or equal to 20 µm, less than or equal to 15 µm, less than or equal to 10 µm, less than or equal to 8 µm, less than or equal to 6 µm, less than or equal to 4 µm, or less. In embodiments, the polymer layers may individually have a thickness of from greater than or equal to 2 µm to less than or equal to 100 µm, such as from greater than or equal to 4 µm to less than or equal to 95 µm, from greater than or equal to 6 µm to less than or equal to 90 µm, from greater than or equal to 8 µm to less than or equal to 85 µm, from greater than or equal to 10 µm to less than or equal to 80 µm, from greater than or equal to 15 µm to less than or equal to 75 µm, from greater than or equal to 20 µm to less than or equal to 70 µm, from greater than or equal to 25 µm to less than or equal to 65 µm, from greater than or equal to 30 µm to less than or equal to 60 µm, from greater than or equal to 35 µm to less than or equal to 55 µm, from greater than or equal to 40 µm to less than or equal to 50 µm, and any and all sub-ranges formed from these endpoints. Where multiple polymer layers are included in the glass-based article, the polymer layers in the glass-based article may have different thicknesses. In other embodiments, where multiple polymer layers are included in the glass-based article the polymer layers may have substantially equivalent or equivalent thicknesses. In embodiments, the polymer layer may be thinner than the glass-based layers to which it is adjacent.

The polymer layers may be relatively stiff, such as a polymer with an elastic modulus greater than or equal to 100 MPa at a strain rate of 1/s. The stiffness of the polymer layer material may constrain the glass-based layers, preventing the growth of cracks in the glass-based layers and prevent the glass-based layer from flexing and breaking. The polymer layer may have an elastic modulus greater than or equal to 100 MPa at a strain rate of 1/s, such as greater than or equal to 105 MPa, greater than or equal to 110 MPa, greater than or equal to 115 MPa, greater than or equal to 120 MPa, greater than or equal to 125 MPa, or more. In embodiments, the stiffness of the polymer layer may be related to the thickness of the polymer layer, such that the elastic modulus of the polymer layer divided by the thickness of the polymer layer is greater than or equal to 1 MPa/µm, such as greater than or equal to 2 MPa/µm, greater than or equal to 3 MPa/µm, greater than or equal to 4 MPa/µm, greater than or equal to 5 MPa/µm, greater than or equal to 6 MPa/µm, greater than or equal to 7 MPa/µm, greater than or equal to 8 MPa/µm, greater than or equal to 9 MPa/µm, greater than or equal to 10 MPa/µm, or more.

The polymer layer may be formed from any appropriate polymer material. In embodiments, the polymer layer may include a resin, such as an optically clear resin. The polymer layer may be commercially available, such as resins commonly utilized to repair windshields. In embodiments, the polymer layer may include an ultraviolet curable resin or a heat curable resin. The polymer layer may have a transmission of greater than or equal to 90% over the wavelength range of 400 nm to 750 nm., such as greater than or equal to 91%, greater than or equal to 92%, greater than or equal to 93%, greater than or equal to 94%, greater than or equal to 95%, greater than or equal to 96%, greater than or equal to 97%, greater than or equal to 98%, greater than or equal to 99%, or more. Where multiple polymer layers are included in the glass-based article, the polymer layers in the glass-based article may be formed from the same material. In other embodiments, where multiple polymer layers are included in the glass-based article the polymer layers may be formed from different materials.

The glass-based layers may include glass or glass ceramic materials. In embodiments, the composition of the glass-based layers included in the glass-based article may be substantially equivalent or equivalent. The glass-based layers may be an aluminosilicate glass, such as an aluminoborosilicate glass. In embodiments, the glass-based layers may be selected to provide a high resistance to scratch damage. The glass-based layers may have a Knoop scratch threshold of greater than or equal to 5 N, such as greater than or equal to 5.5 N, greater than or equal to 6 N, or more. The glass-based layers may have a Vickers scratch threshold of greater than or equal to 0.5 N, such as greater than or equal to 1.0 N, greater than or equal to 1.5 N, or more. The scratch resistance of the glass-based layers may be higher than the scratch resistance of in exchange strengthened glass articles previously employed in applications for which the glass-based articles described herein are useful. The glass-based layers may have a transmission of greater than or equal to 90% over the wavelength range of 400 nm to 750 nm., such as greater than or equal to 91%, greater than or equal to 92%, greater than or equal to 93%, greater than or equal to 94%, greater than or equal to 95%, greater than or equal to 96%, greater than or equal to 97%, greater than or equal to 98%, greater than or equal to 99%, or more.

In some embodiments, the glass-based layers may include any appropriate amount of $SiO_2$. $SiO_2$ is the largest constituent of the glass-based layers and, as such, $SiO_2$ is the primary constituent of the glass network formed from the glass composition. If the concentration of $SiO_2$ in the glass composition is too high, the formability of the glass composition may be diminished as higher concentrations of $SiO_2$ increase the difficulty of melting the glass, which, in turn, adversely impacts the formability of the glass. In some embodiments, the glass composition of the glass core layer may include $SiO_2$ in an amount of about 50 mol % to about 85 mol %, such as about 55 mol % to about 80 mol %, about 60 mol % to about 75 mol %, about 65 mol % to about 70 mol %, and any sub-ranges formed by any of these endpoints.

The glass-based layers may also include any appropriate amount of $Al_2O_3$. $Al_2O_3$ may serve as a glass network former, similar to $SiO_2$. $Al_2O_3$ may increase the viscosity of the glass composition due to its tetrahedral coordination in a glass melt formed from the glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes, such as the fusion forming process. The inclusion of $Al_2O_3$ in the glass-based layers prevents phase separation and reduces the number of non-bridging oxygens (NBOs) in the glass. Additionally, $Al_2O_3$ can improve the effectiveness of ion exchange should the glass-based layers be strengthened by ion exchange prior to or after the lamination of the glass-based article. In some embodiments, the glass-based layer may include $Al_2O_3$ in an amount of about 5 mol % to about 30 mol %, such as about 10 mol % to about 25 mol %, about 15 mol % to about 20 mol %, and any sub-ranges formed by any of these endpoints.

The glass-based layer may also include any amount of $B_2O_3$ sufficient to produce the desired scratch resistance. The inclusion of $B_2O_3$ in the glass-based layer increases the native damage resistance of the glass. In some embodiments, the glass-based layer may include $B_2O_3$ in an amount of about 5 mol % to about 30 mol %, such as about 10 mol % to about 25 mol %, about 15 mol % to about 20 mol %, and any sub-ranges formed by any of these endpoints.

The glass-based layer may include an alkali metal oxide in any appropriate amount. The sum of the alkali metal oxides (e.g., $Li_2O$, $Na_2O$, and $K_2O$ as well as other alkali metal oxides including $Cs_2O$ and $Rb_2O$) in the glass composition may be referred to as "$R_2O$", and $R_2O$ may be expressed in mol %. In some embodiments, the glass-based layer may be substantially free, or free, of $R_2O$. In other embodiments, the glass-based layer may include $R_2O$ in an amount greater that 0 mol %, such glass-based layers allow for ion exchange strengthening of the glass-based layers.

The glass-based layer may include alkaline metal oxides in any appropriate amount. The sum of the alkaline metal oxides (BeO, MgO, SrO, BaO, and ZnO) in the glass composition may be referred to as "R'O", and R'O may be expressed in mol %.

The content of alkali metal oxides, alkaline metal oxides, and alumina in the glass-based layer may be balanced to achieve the desired properties. The balancing of these components may result in a reduced concentration of non-bridging oxygens in the glass-based layer. In embodiments, the glass-based layer is characterized by R'O—$R_2O$—$Al_2O_3$ being less than or equal to 4 mol %, such as less than or equal to 3 mol %, less than or equal to 2 mol %, less than or equal to 1 mol %, or less. In embodiments, the boron oxide in the glass-based layer may also be balanced against the content of alkali metal oxides, alkaline metal oxides, and alumina. In embodiments, the glass-based layer includes $B_2O_3$ in an amount greater than or equal to R'O—$R_2O$—$Al_2O_3$+4 mol %.

In some embodiments, the glass-based layers of the glass-based article may have a composition including: about 50 mol % to about 85 mol % $SiO_2$, about 5 mol % to about 30 mol % $Al_2O_3$, and about 5 mol % to about 30 mol % $B_2O_3$. An exemplary composition for the glass-based layer is provided in Table I below. The glass-based layer may include the glass compositions produced in accordance with U.S. Pat. No. 7,851,394 and/or U.S. Pat. No. 7,534,734, each of which are incorporated herein by reference in their entirety.

TABLE I

| Composition (mol %) | |
|---|---|
| $SiO_2$ | 67.50 |
| $Al_2O_3$ | 11.06 |
| $B_2O_3$ | 9.83 |
| $P_2O_5$ | 0.00 |
| $Na_2O$ | 0.00 |
| $SnO_2$ | 0.08 |
| $K_2O$ | 0.00 |
| MgO | 2.26 |
| BaO | 0.01 |
| SrO | 0.50 |
| CaO | 8.76 |

The glass-based articles described herein may appear transparent and colorless. In embodiments, the glass-based articles may have a transmission of greater than or equal to 90% over the wavelength range of 400 nm to 750 nm., such as greater than or equal to 91%, greater than or equal to 92%, greater than or equal to 93%, greater than or equal to 94%, greater than or equal to 95%, greater than or equal to 96%, greater than or equal to 97%, greater than or equal to 98%, greater than or equal to 99%, or more.

The glass-based articles may have an elastic modulus in a direction of perpendicular to the major plane of the glass-based layers of greater than 30 GPa, or more. This elastic modulus may contribute to the ability of the glass-based article to absorb impact energy without fracturing.

The glass-based articles may have any appropriate geometry. In embodiments, the glass-based articles are substantially flat or planar. In some embodiments, the glass-based articles may include openings or notches, such as openings to accommodate cameras, speakers, microphones, or fingerprint sensors.

The glass-based articles may be produced by any appropriate lamination process. In general, the glass-based articles are produced by disposing a polymer layer between glass-based layers, and then curing the polymer layer to achieve an elastic modulus of the polymer layer of greater than or equal to 100 MPa at a strain rate of 1/s. Where more than two glass-based layers are to be included in the glass-based articles, the disposing step may be repeated for each additional glass-based layer to be added to form a laminate stack.

In embodiments where more than one polymer layer is present, all of the polymer layers may be cured concurrently.

The glass-based article may be cut or machined to a desired geometry after lamination. This is possible at least in part due to the lack of a significant compressive stress in the glass-based article. In embodiments, the glass-based layers may be cut and machined to a desired final geometry before assembly and curing of the laminate stack.

The disposition of the polymer layer may be carried out with any method capable of producing a polymer layer with the desired thickness. In embodiments, the polymer layer may be disposed using a doctor blade, roller, spray system, or any other technique known in the art. After the polymer layer is disposed between the glass-based layers, pressure may be applied to the glass-based layers to remove any air bubbles or excess polymer from the laminate.

The curing of the polymer layer may be carried out with any appropriate technique. In embodiments, the polymer layer may be cured by exposing the laminate to ultraviolet radiation. In embodiments, the polymer layer may be cured by heat treating the laminate as a whole or by locally heating the polymer layer. For example, the laminate may be placed in an oven, in a furnace, or on a hot plate to heat treat and cure the polymer layer. In some embodiments, a combination of ultraviolet radiation and heat treatment may be employed to cure the polymer layer. In some embodiments, the curing process may induce some shrinkage of the polymer layer, further constraining the glass-based layers.

EXAMPLES

The embodiments described herein will be further clarified by the following examples.

Figure 5:
FIG. 5 is a photograph of a glass-based article according to one or more embodiments shown and described herein after being subjected to a drop test.

A laminated glass-based article was prepared by cutting six glass-based layers to a desired geometry, where the glass-based layers had the composition of Table I above and had a thickness of 100 µm. Commercially available Ultra-Bond 45 cps resin was applied to the top of a first glass-based layer, and a second glass-based layer was placed on top of the resin layer. The layers were then pressed to remove any pockets or air bubbles and exude any excess resin. The application of resin and additional glass-based layers was repeated until a laminate stack containing six glass-based layers was produced. The laminate stack was then irradiated with ultraviolet light from a commercially available GE 15W F15T8 BLB lamp to cure the resin. The cured glass-based article was then mounted to a drop test vehicle and dropped onto 180 grit aluminum oxide sandpaper starting from a height of 20 cm and increasing in 10 cm increments up to a drop height of 220 cm. Samples that did not fail at a drop height of 220 cm were then subjected to the same test protocol but with 30 grit sandpaper. FIG. 5 shows the glass-based article mounted in the drop test vehicle after 20 drops onto 180 grit sandpaper and 20 drops onto 30 grit sandpaper. As shown in FIG. 5, the glass-based article 500 exhibits pitting as a result of the impact, but does not appear fractured.

Figure 6:
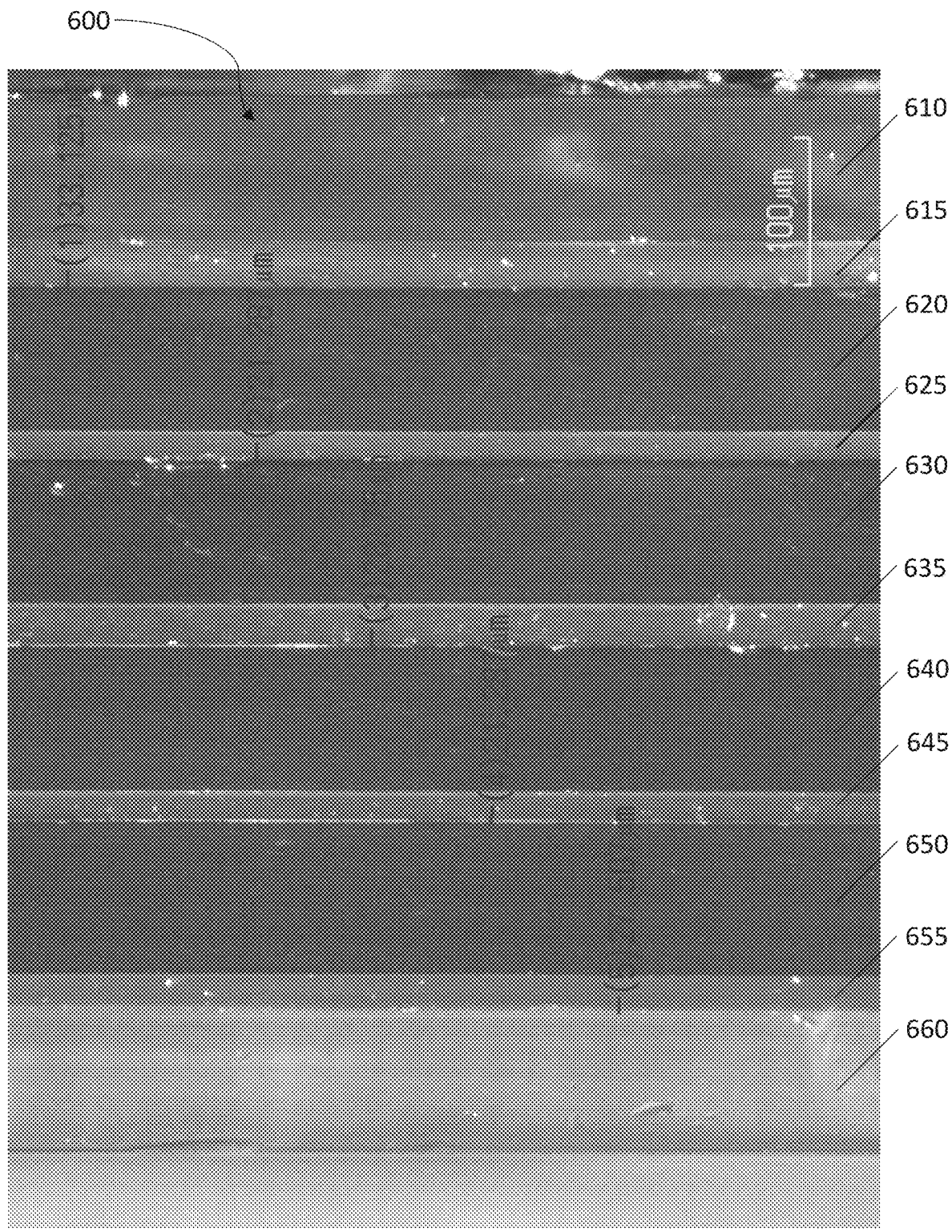
FIG. 6 is a photograph of a cross section of a glass-based article, according to one or more embodiments described herein.

A cross section of a glass-based article produced using the same procedure as the glass-based article of FIG. 5 is shown in FIG. 6. The glass-based article 600 in FIG. 6 includes six 100 µm thick glass-based layers 610, 620, 630, 640, 650, ad 660, each having the composition of Table I above. The glass-based article includes a first polymer layer 615 with a thickness of 33.125 µm, a second polymer layer 625 with a thickness of 21.287 µm, a third polymer layer 635 with a thickness of 28.75 µm, a fourth polymer layer 645 with a thickness of 21.287 µm, and a fifth polymer layer 655 with a thickness of 27.507 µm.

A second sample was produced using the same procedure, but with only three glass-based layers and two polymer layers. This sample failed at an average drop height of 98 cm onto 180 grit sandpaper. Thus, the thinner more compliant glass-based article was not as rugged as the six glass-based layer article.

Glass-based articles were produced with two glass-based layers of different thickness and the composition of Table I and a single polymer layer. The glass-based layer thicknesses and average polymer layer thickness are reported in Table II below. The commercially available UltraBond 45 cps resin was cured with a combination of heat treatment and ultraviolet (UV) radiation. Samples A and B were cured at room temperature. Samples C, D, and E were heat treated prior to curing at the temperature and for a pre-cure time period as shown in Table II, the samples were then cured at the heat treatment temperature with UV radiation and at room temperature with UV radiation for the time periods reported in Table II.

TABLE II

| Sample | Thickness (µm) | | | Heat Treatment Temperature (° C.) | Time at Temperature Pre-Cure (min) | Cure Time (min) | | Average Crack Length (µm) |
| | 1st Glass Layer | 2nd Glass Layer | Polymer Layer | | | At Heat Treatment Temperature | At Room Temperature | |
| --- | --- | --- | --- | --- | --- | --- | --- | --- |
| A | 100 | 700 | 42.8 | 22 | | | | 6347 |
| B | 100 | 700 | 17 | 22 | | | | 6178 |
| C | 100 | 700 | 13.6 | 95 | 8 | 1 | 1 | 4966 |
| D | 100 | 700 | 19.8 | 95 | 8 | 1 | 1 | 5269 |
| E | 100 | 700 | 20.6 | 95 | 8 | 1 | 1 | 4823 |

The average crack length reported in Table II was measured as the maximum crack length after dropping a ball onto the cured glass-based articles from a height of three inches, with the thinner glass layer in contact with 120 grit sandpaper.

Glass-based articles were produced with two or three glass-based layers of different thickness and the composition of Table I and a one or two polymer layers. The glass-based layer thicknesses and average polymer layer thickness are reported in Table III below. The commercially available UltraBond 45 cps resin was cured with a combination of heat treatment and ultraviolet (UV) radiation. Samples F, H, and J were heat treated prior to curing at the temperature and for a pre-cure time period as shown in Table III, the samples were then cured at the heat treatment temperature with UV radiation for the time periods reported in Table III. Samples G and I were not heat treated prior to curing with UV radiation for the time periods reported in Table III.

TABLE III

| Sample | Thickness (μm) 1st Glass Layer | Thickness (μm) 2nd Glass Layer | Thickness (μm) 3rd Glass Layer | Thickness (μm) Polymer Layers | Heat Treatment Temperature (° C.) | Time at Temperature Pre-Cure (min) | Cure Time (min) | Average Crack Length (μm) |
|---|---|---|---|---|---|---|---|---|
| F | 500 | 200 |  | 4.8 | 40 | 10 | 10 | 5993 |
| G | 500 | 200 |  | 10.6 | 40 |  | 10 | 5227 |
| H | 500 | 100 | 100 | 16.4 | 40 | 10 | 10 | 5438 |
| I | 500 | 100 | 100 | 2.4 | 40 |  | 10 | 4310 |
| J | 500 | 200 |  | 5.6 | 40 | 10 | 10 | 6151 |

The average crack length reported in Table III was measured as the maximum crack length after dropping a ball onto the cured glass-based articles from a height of three inches, with the thinner glass layer in contact with 120 grit sandpaper.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An article, comprising:
a first glass-based layer;
a second glass-based layer; and
a first polymer layer disposed between the first glass-based layer and the second glass-based layer,
wherein at least one of the first glass-based layer and the second glass-based layer have a thickness of less than or equal to 200 μm, the first polymer layer has a thickness of less than or equal to 100 μm, and the first polymer layer has an elastic modulus greater than or equal to 100 MPa at a strain rate of 1/s.

2. The article of claim 1, wherein both the first glass-based layer and the second glass-based layer have a thickness of less than or equal to 200 μm.

3. The article of claim 1, further comprising:
a third glass-based layer; and
a second polymer layer disposed between the second glass-based layer and the third glass-based layer,
wherein the third glass-based layer has a thickness of less than or equal to 200 μm, the second polymer layer has a thickness of less than or equal to 100 μm, and the second polymer layer has an elastic modulus greater than or equal to 100 MPa at a strain rate of 1/s.

4. The article of claim 3, further comprising:
a fourth glass-based layer;
a fifth glass-based layer;
a sixth glass-based layer;
a third polymer layer disposed between the third glass-based layer and the fourth glass-based layer;
a fourth polymer layer disposed between the fourth glass-based layer and the fifth glass-based layer; and
a fifth polymer layer disposed between the fifth glass-based layer and the sixth glass-based layer,
wherein the fourth glass-based layer, fifth glass-based layer, and sixth glass-based layer have a thickness of less than or equal to 200 μm, the third polymer layer, fourth polymer layer, and fifth polymer layer have a thickness of less than or equal to 100 μm, and the third polymer layer, fourth polymer layer, and fifth polymer layer have an elastic modulus greater than or equal to 100 MPa at a strain rate of 1/s.

5. The article of claim 1, wherein the first glass-based layer has a Knoop scratch threshold greater than or equal to 5 N.

6. The article of claim 1, wherein the first glass-based layer has a Vickers scratch threshold greater than or equal to 0.5 N.

7. The article of claim 1, wherein the first glass-based layer and the second glass-based layer have a thickness of less than or equal to 100 μm.

8. The article of claim 1, wherein the first polymer layer has a thickness of less than or equal to 50 μm.

9. The article of claim 1, wherein the first glass-based layer is an aluminoborosilicate.

10. The article of claim 1, wherein the first glass-based layer comprises:
50 mol % to 85 mol % $SiO_2$;
5 mol % to 30 mol % $B_2O_3$; and
5 mol % to 30 mol % $Al_2O_3$.

11. The article of claim 1, wherein the first glass-based layer is characterized by:
R'O—$R_2$O—$Al_2O_3 \leq 4$ mol %,
wherein R'O=BeO, MgO, SrO, BaO, and ZnO, and $R_2$O=$Li_2$O, $Na_2$O, $K_2$O, $Rb_2$O, and $Cs_2$O.

12. The article of claim 1, wherein the first glass-based layer is characterized by:
$B_2O_3 \geq$ R'O—$R_2$O—$Al_2O_3 + 4$ mol %,
wherein R'O=BeO, MgO, SrO, BaO, and ZnO, and $R_2$O=$Li_2$O, $Na_2$O, $K_2$O, $Rb_2$O, and $Cs_2$O.

13. The article of claim 1, wherein the first glass-based layer is substantially free of $R_2$O, wherein $R_2$O=$Li_2$O, $Na_2$O, $K_2$O, $Rb_2$O, and $Cs_2$O.

14. The article of claim 1, wherein the first polymer layer has a ratio of the elastic modulus divided by the thickness of greater than or equal to 1 MPa/μm.

15. The article of claim 1, wherein the first polymer layer has a ratio of the elastic modulus divided by the thickness of greater than or equal to 10 MPa/μm.

16. The article of claim 1, wherein an elastic modulus of the article is greater than 30 GPa in a direction perpendicular to the major plane of the first glass-based layer.

17. The article of claim 1, wherein the first glass-based layer and the second glass-based layer have a thickness that is greater than the thickness of the first polymer layer.

18. The article of claim 1, wherein the first polymer layer comprises an ultraviolet curable resin.

19. The article of claim 1, wherein the article has a transmission of greater than or equal to 90% in the wavelength range of 400 nm to 750 nm.

20. A consumer electronic product, comprising:
a housing having a front surface, a back surface and side surfaces;

electrical components provided at least partially within the housing, the electrical components including at least a controller, a memory, and a display, the display being provided at or adjacent the front surface of the housing; and a cover glass disposed over the display, wherein at least a portion of at least one of the housing and the cover glass comprises the article of claim 1.

21. A method, comprising:

disposing a first polymer layer between a first glass-based layer and a second glass-based layer; and curing the first polymer layer such that the first polymer layer has an elastic modulus greater than or equal to 100 MPa at a strain rate of 1/s, wherein at least one of the first glass-based layer and the second glass-based layer have a thickness of less than or equal to 200 μm, and the first polymer layer has a thickness of less than or equal to 100 μm.

22. The method of claim 21, wherein both the first glass-based layer and the second glass-based layer have a thickness of less than or equal to 200 μm.

23. The method of claim 21, further comprising:

disposing a second polymer layer between the second glass-based layer and a third glass-based layer; and curing the second polymer layer such that the second polymer layer has an elastic modulus greater than or equal to 100 MPa at a strain rate of 1/s, wherein the third glass-based layer has a thickness of less than or equal to 200 μm, and the second polymer layer has a thickness of less than or equal to 100 μm.

24. The method of claim 23, further comprising:

disposing a third polymer layer between the third glass-based layer and a fourth glass-based layer;

disposing a fourth polymer layer between the fourth glass-based layer and a fifth glass-based layer;

disposing a fifth polymer layer between the fifth glass-based layer and a sixth glass-based layer; and curing the third polymer layer, fourth polymer layer, and fifth polymer layer such that the third polymer layer, fourth polymer layer, and fifth polymer layer have an elastic modulus greater than or equal to 100 MPa at a strain rate of 1/s, wherein the fourth glass-based layer, fifth glass-based layer, and sixth glass-based layer have a thickness of less than or equal to 200 μm, and the third polymer layer, fourth polymer layer, and fifth polymer layer have a thickness of less than or equal to 100 μm.

25. The method of claim 23, wherein the curing of all of the polymer layers takes place concurrently.

26. The method of claim 21, wherein curing the first polymer layer comprises exposing the first polymer layer to ultraviolet radiation.

27. The method of claim 21, wherein curing the first polymer layer comprises heating the first polymer layer.

* * * * *